(12) United States Patent
Mori et al.

(10) Patent No.: US 10,962,849 B2
(45) Date of Patent: Mar. 30, 2021

(54) LIQUID CRYSTAL DISPLAY DEVICE

(71) Applicants: Panasonic Liquid Crystal Display Co., Ltd., Himeji (JP); Pasona Knowledge Partner Inc., Osaka (JP)

(72) Inventors: Ikuko Mori, Hyogo (JP); Tomohiro Murakoso, Hyogo (JP); Kazuhiko Tsuda, Hyogo (JP)

(73) Assignees: Panasonic Liquid Crystal Display Co., Ltd., Hyogo (JP); Pasona Knowledge Partner Inc., Osaka (JP)

( * ) Notice: Subject to any disclaimer, the term of this patent is extended or adjusted under 35 U.S.C. 154(b) by 103 days.

(21) Appl. No.: 15/882,702

(22) Filed: Jan. 29, 2018

(65) Prior Publication Data

US 2018/0217432 A1 Aug. 2, 2018

(30) Foreign Application Priority Data

Jan. 30, 2017 (JP) .............................. JP2017-013915

(51) Int. Cl.
  *G02F 1/1347* (2006.01)
  *G02F 1/1333* (2006.01)
  *G02F 1/1335* (2006.01)
  *G02F 1/1337* (2006.01)
  *G02F 1/1362* (2006.01)

(52) U.S. Cl.
  CPC ........ *G02F 1/13471* (2013.01); *G02F 1/1337* (2013.01); *G02F 1/133305* (2013.01); *G02F 1/133345* (2013.01); *G02F 1/133504* (2013.01); *G02F 1/133512* (2013.01); *G02F 1/133528* (2013.01); *G02F 2001/133302* (2013.01); *G02F 2001/136222* (2013.01); *G02F 2201/123* (2013.01)

(58) Field of Classification Search
  CPC ............... G02F 1/1347; G02F 1/13471; G02F 1/133504; G02F 1/1337; G02F 1/133528
  See application file for complete search history.

(56) References Cited

U.S. PATENT DOCUMENTS

| | | | | |
|---|---|---|---|---|
| 2007/0139584 | A1* | 6/2007 | Jin | G02F 1/13471 349/74 |
| 2008/0272375 | A1* | 11/2008 | Oh | G02F 1/13471 257/72 |
| 2009/0147186 | A1* | 6/2009 | Nakai | G02F 1/13471 349/74 |
| 2010/0103148 | A1* | 4/2010 | Okazaki | G02F 1/1323 345/204 |
| 2011/0261268 | A1 | 10/2011 | Nakai et al. | |

FOREIGN PATENT DOCUMENTS

WO 2007/040127 4/2007

* cited by examiner

*Primary Examiner* — Jessica M Merlin
(74) *Attorney, Agent, or Firm* — Hamre, Schumann, Mueller & Larson, P.C.

(57) ABSTRACT

A liquid crystal display device includes a plurality of display panels which are disposed so as to overlap each other, each of the display panels displaying an image. The liquid crystal display device includes a first substrate; a second substrate disposed opposite to the first substrate in a first direction; a first liquid crystal layer disposed between the first substrate and the second substrate; a third substrate disposed opposite to the first substrate in a second direction that is an opposite direction to the first direction; and a second liquid crystal layer disposed between the first substrate and the third substrate.

14 Claims, 13 Drawing Sheets

LIQUID CRYSTAL DISPLAY DEVICE

CROSS-REFERENCE TO RELATED APPLICATION

The present application claims priority from Japanese application JP 2017-013915 filed on Jan. 30, 2017, the content of which is hereby incorporated by reference into this application.

TECHNICAL FIELD

This disclosure relates with liquid crystal display device.

BACKGROUND

A technique, in which two display panels overlap each other and an image is displayed on each display panel based on an input video signal, is conventionally proposed to improve contrast of a liquid crystal display device (for example, see PCT International Publication No. WO2007/040127).

Specifically, for example, a color image is displayed on a front-side (observer-side) display panel in two display panels disposed back and forth, and a black-and-white image is displayed on a rear-side (backlight-side) display panel, thereby improving contrast.

SUMMARY

There is an issue that the liquid crystal display device becomes heavy and thick, because the liquid crystal display device is constructed with the four glass substrates.

The present disclosure is made in consideration of such a situation, and an object of the present disclosure is to achieve weight reduction and low profile of the liquid crystal display device.

In one general aspect, the instant application describes a liquid crystal display device includes a plurality of display panels which are disposed so as to overlap each other, each of the display panels displaying an image. The liquid crystal display device includes a first substrate; a second substrate disposed opposite to the first substrate in a first direction; a first liquid crystal layer disposed between the first substrate and the second substrate; a third substrate disposed opposite to the first substrate in a second direction that is an opposite direction to the first direction; and a second liquid crystal layer disposed between the first substrate and the third substrate.

The above general aspect may include one or more of the following features.

The first substrate may include a first surface on a side of the first direction and a second surface opposite to the first surface on a side of the second direction.

A first gate line, a first source line, a first insulator, an electrode constituting a first thin film transistor, and a first pixel electrode may be formed on the first surface of the first substrate, and a diffusion layer and a polarizing layer may be formed on the second surface of the first substrate.

The first substrate may be a film substrate. The first substrate may include a first surface on a side of the first direction and a second surface opposite to the first surface on a side of the second direction. A first gate line, a first source line, a first insulator, an electrode constituting a first thin film transistor, and a first pixel electrode may be formed on the first surface of the first substrate, and a polarizing layer may be formed on the second surface of the first substrate.

The first substrate may include a first surface on a side of the first direction and a second surface opposite to the first surface on a side of the second direction, and an alignment film may be formed on the first surface and the second surface of the first substrate.

An alignment film may be formed on the second surface of the first substrate, and the alignment film may be in contact with the diffusion layer or the polarizing layer.

The first substrate may include a glass substrate or a film substrate, the first substrate may be disposed between the first liquid crystal layer and the second liquid crystal layer, and the glass substrate or the film substrate may not be disposed except for the first substrate between the first liquid crystal layer and the second liquid crystal layer.

A color filter may be further formed on the first surface of the first substrate.

A black matrix and a color filter may be formed on the second substrate, and a second gate line, a second source line, a second insulator, an electrode constituting a second thin film transistor, and a second pixel electrode may be formed on the third substrate.

The first substrate may be a film substrate, and the second substrate and the third substrate may be a glass substrate.

A number of second pixel electrodes per unit area may be smaller than a number of first pixel electrodes per unit area.

According to the above liquid crystal display device, weight reduction and low profile of the liquid crystal display device can be achieved compared with the conventional liquid crystal display device constructed with four substrates.

DETAILED DESCRIPTION

Hereinafter, an exemplary embodiment of the present disclosure will be described with reference to the drawings.

A liquid crystal display device according to one exemplary embodiment includes a plurality of display panels that display images, a plurality of driving circuits (a plurality of source drivers and a plurality of gate drivers) that drive the display panels, a plurality of timing controllers that control the driving circuits, an image processor that performs image processing on an input video signal input from an outside and outputs image data to each of the timing controllers, and a backlight that irradiates the plurality of display panels with light from a rear surface side. When viewed from the observer side, the plurality of display panels are disposed while overlapping each other in a front-back direction. An image is displayed on each of the display panels. A liquid crystal display device including two display panels will be described below by way of example.

Figure 1:
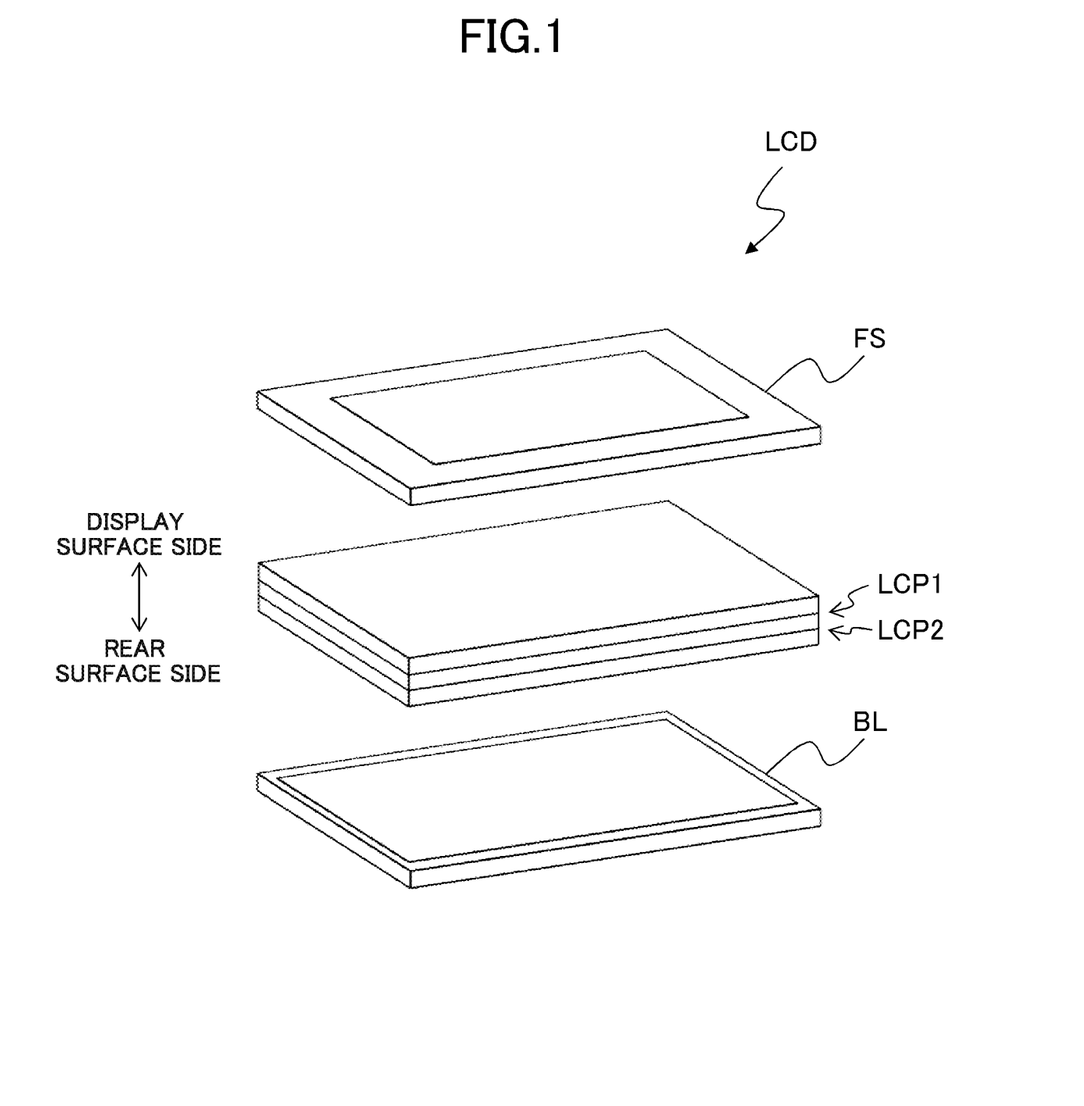
FIG. 1 is a perspective view illustrating a schematic configuration of liquid crystal display device of this exemplary embodiment.

FIG. 1 is a perspective view illustrating a schematic configuration of liquid crystal display device LCD of the exemplary embodiment. As illustrated in FIG. 1, liquid crystal display device LCD includes display panel LCP1 disposed at a position (front side) closer to an observer, display panel LCP2 disposed at a position (rear side) farther away from the observer with respect to display panel LCP1, backlight BL disposed on the rear surface side of display panel LCP2, and front chassis FS that covers display panel LCP1 and display panel LCP2 from the display surface side.

Figure 2:
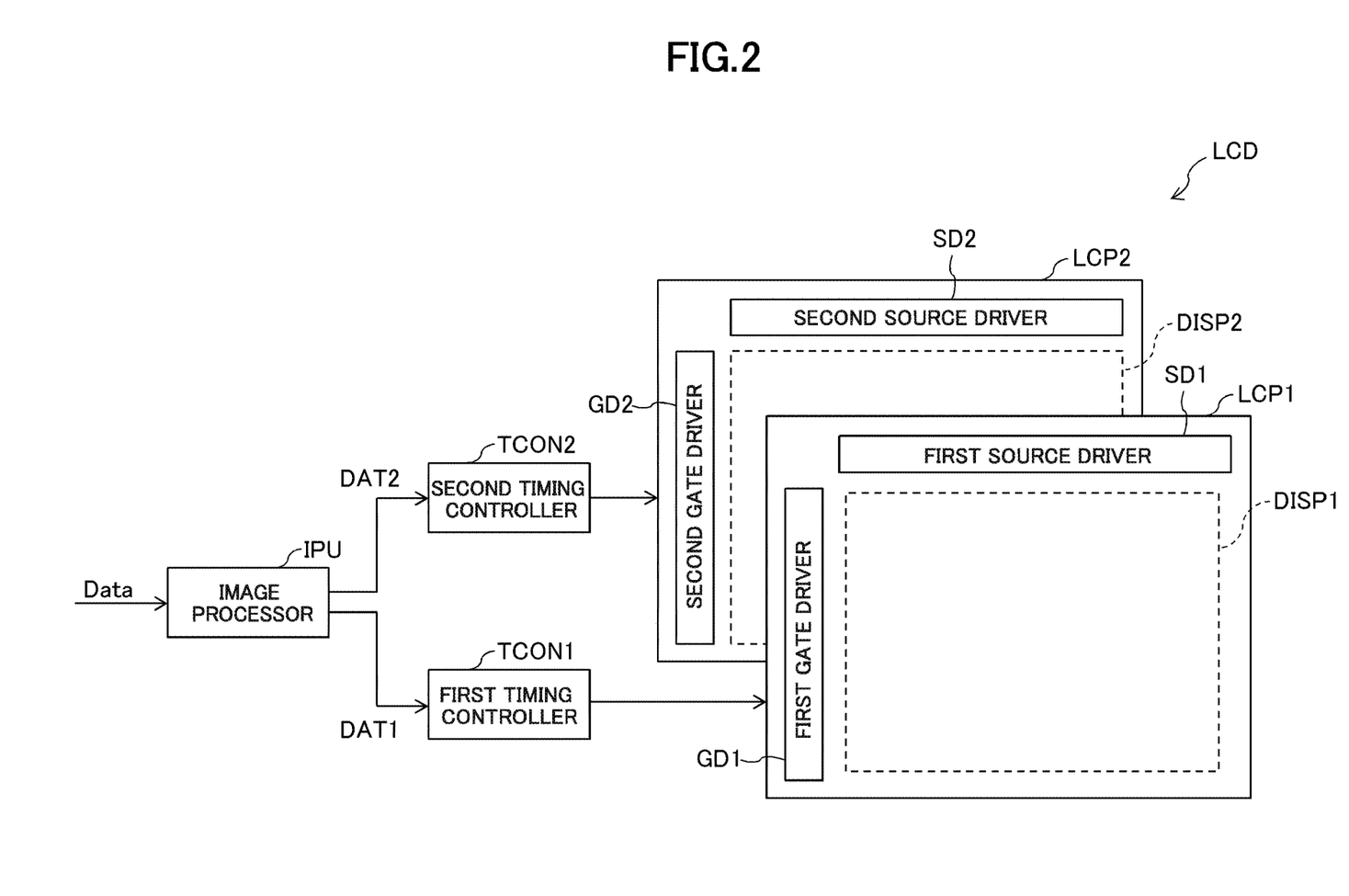
FIG. 2 is a view illustrating the schematic configuration of liquid crystal display device of the exemplary embodiment.

FIG. 2 is a view illustrating the schematic configuration of liquid crystal display device LCD of the exemplary embodiment. As illustrated in FIG. 2, display panel LCP1 includes first source driver SD1 and first gate driver GD1, and display panel LCP2 includes second source driver SD2 and second gate driver GD2. Liquid crystal display device LCD also includes first timing controller TCON1 that controls first source driver SD1 and first gate driver GD1, second timing controller TCON2 that controls second source driver SD2 and second gate driver GD2, and image processor IPU that outputs image data to first timing controller TCON1 and second timing controller TCON2. For example, display panel LCP1 displays a color image in first image display region DISP1 according to the input video signal, and display panel LCP2 displays a black-and-white image in second image display region DISP2 according to the input video signal. Image processor IPU receives input video signal Data transmitted from an external system (not illustrated), performs known image processing on input video signal Data, and then outputs first image data DAT1 to first timing controller TCON1 and outputs second image data DAT2 to second timing controller TCON2. Image processor IPU also outputs a control signal (not illustrated in FIG. 2) such as a synchronizing signal to first timing controller TCON1 and second timing controller TCON2. For example, first image data DAT1 is image data for displaying the color image, and second image data DAT2 is image data for displaying the monochrome image.

Figure 3:
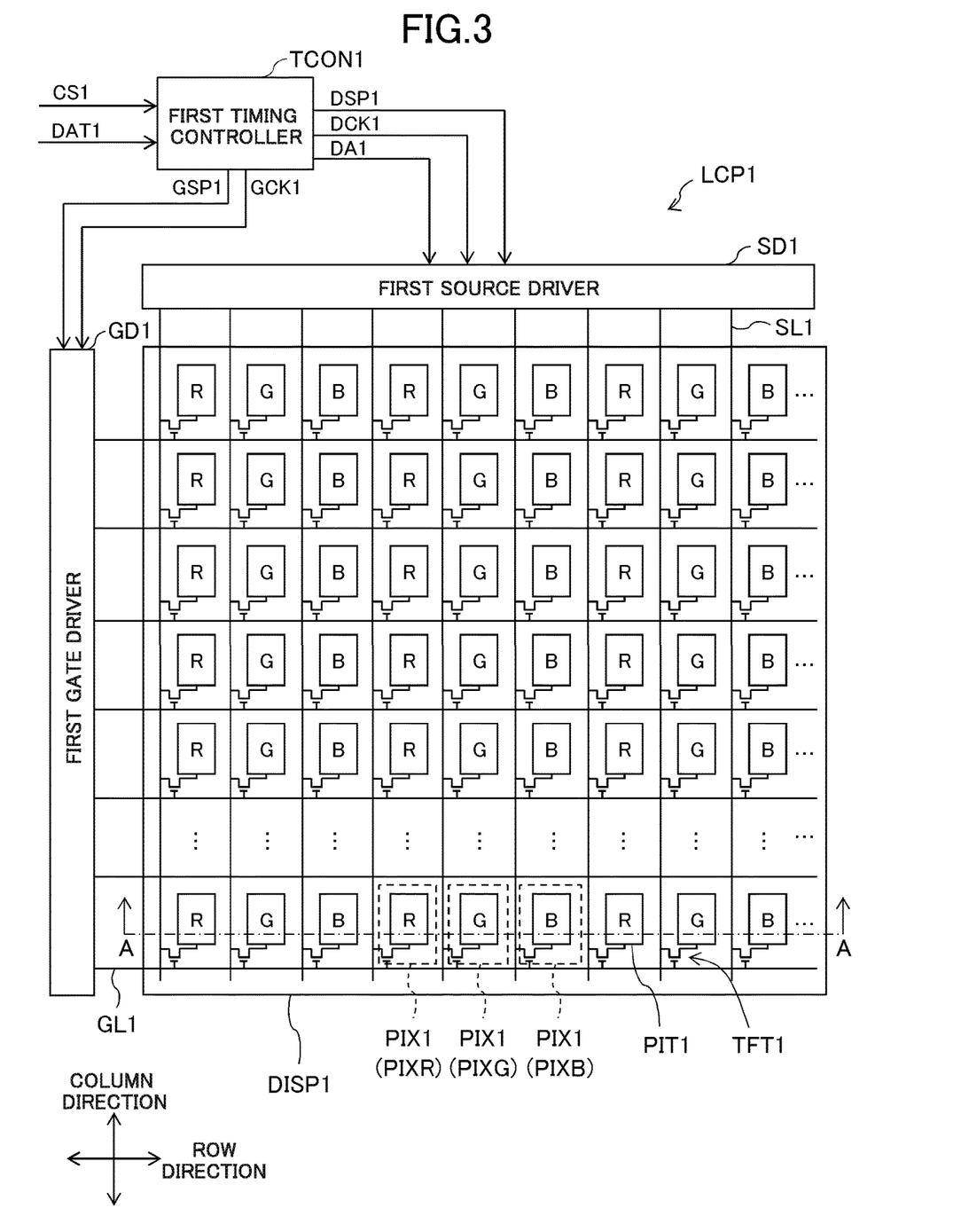
FIG. 3 is a plan view illustrating a schematic configuration of display panel LCP1.
Figure 4:
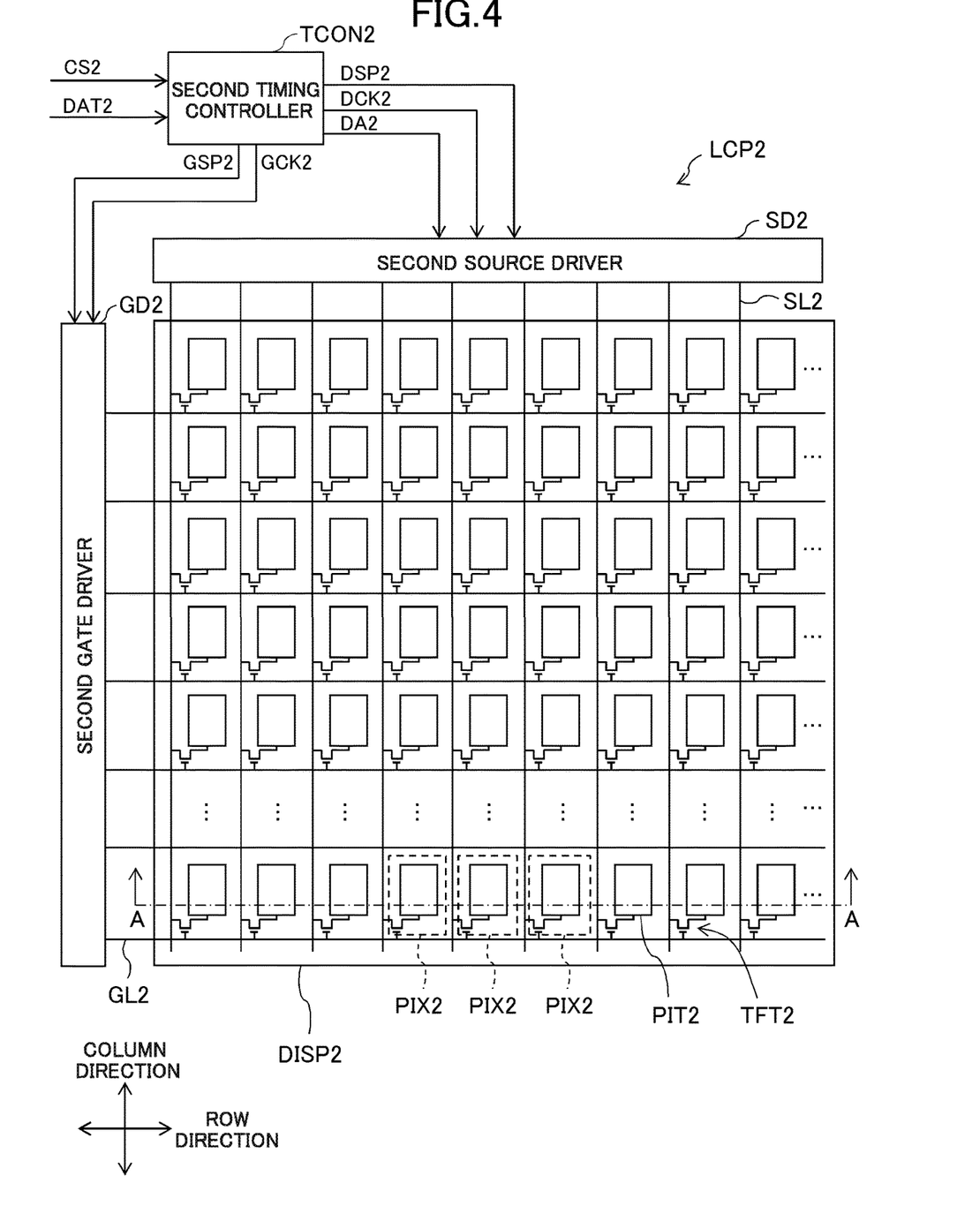
FIG. 4 is a plan view illustrating a schematic configuration of display panel LCP2.
Figure 5:
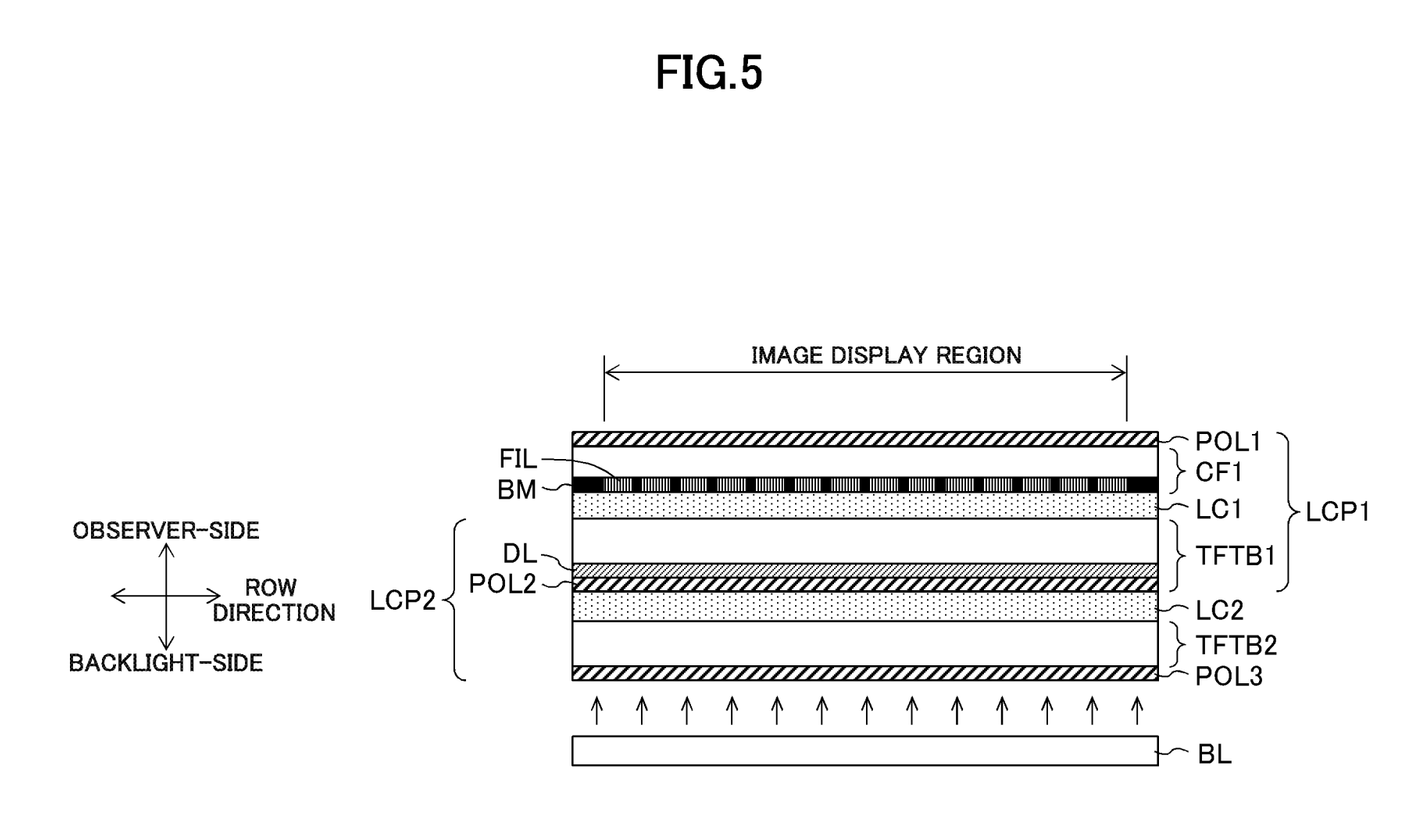
FIG. 5 is a sectional view taken along line A-A in FIGS. 3 and 4.
Figure 6:
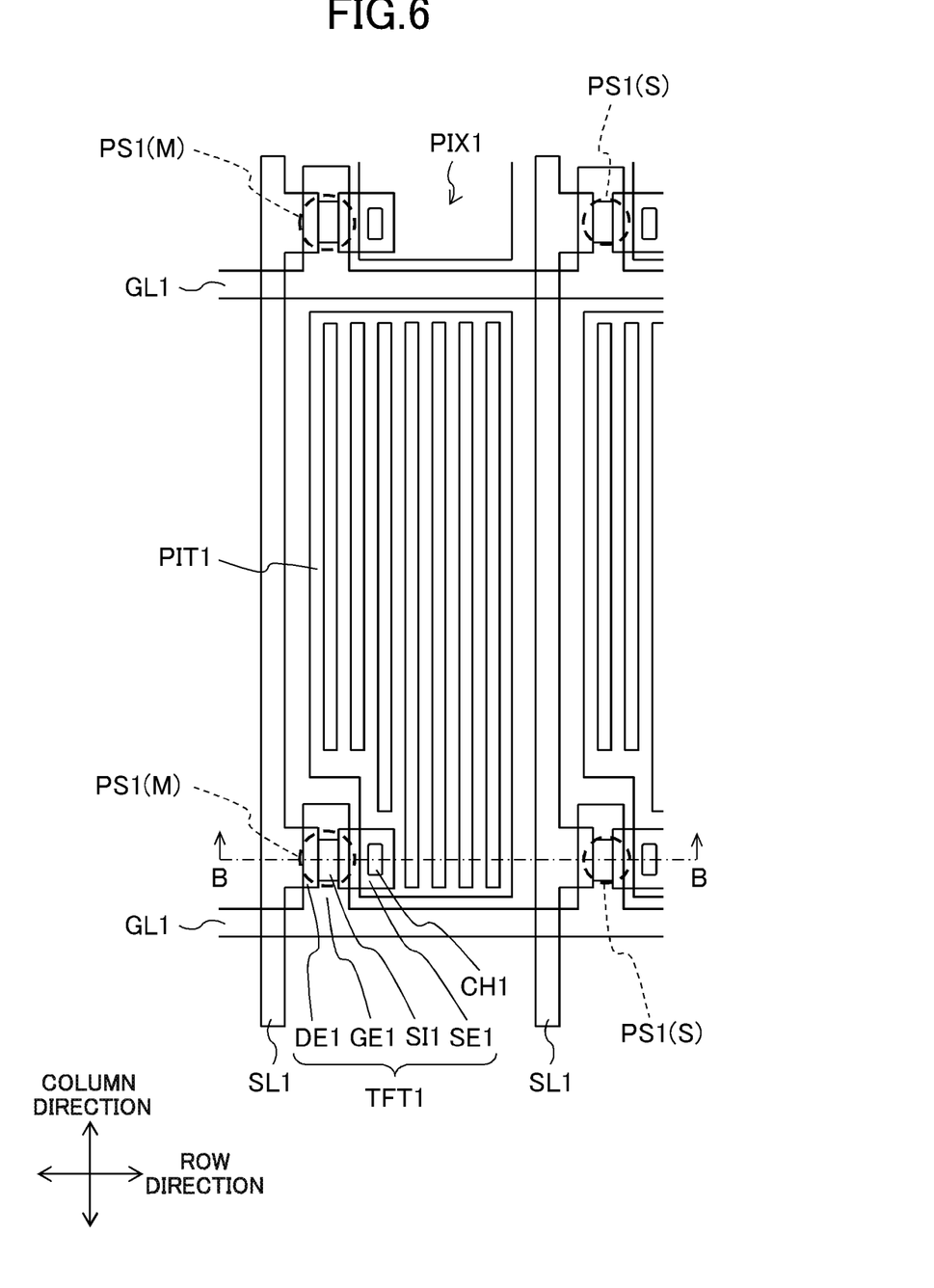
FIG. 6 is a plan view illustrating a schematic configuration of pixel of display panel LCP1.
Figure 7:
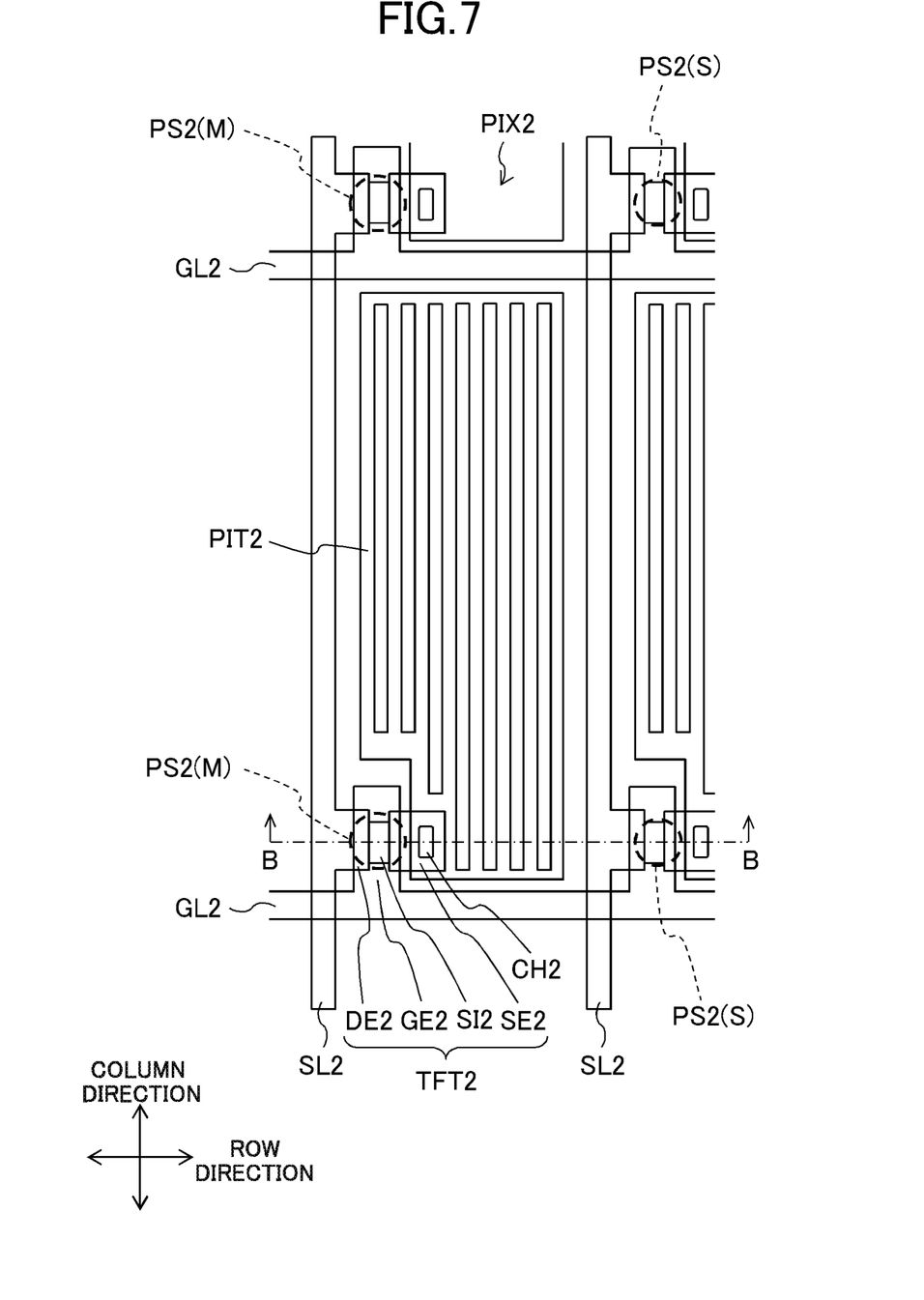
FIG. 7 is a plan view illustrating a schematic configuration of pixel of display panel LCP2.

FIG. 3 is a plan view illustrating a schematic configuration of display panel LCP1, and FIG. 4 is a plan view illustrating a schematic configuration of display panel LCP2. FIG. 5 is a sectional view taken along line A-A in FIGS. 3 and 4. FIG. 6 is a plan view illustrating a schematic configuration of pixel PIX1 of display panel LCP1, and FIG. 7 is a plan view illustrating a schematic configuration of pixel PIX2 of display panel LCP2.

The schematic configuration of display panel LCP1 will be described with reference to FIGS. 3, 5, and 6. As illustrated in FIG. 5, display panel LCP1 includes thin film transistor substrate TFTB1 disposed on the side of backlight BL, counter substrate CF1, which is disposed on the observer side while being opposite to thin film transistor substrate TFTB1, and liquid crystal layer LC1 disposed between thin film transistor substrate TFTB1 and counter substrate CF1. Diffusion layer DL and polarizing layer POL2 are disposed on the side of backlight BL of display panel LCP1, and polarizing plate POL1 is disposed on the observer side.

In thin film transistor substrate TFTB1, as illustrated in FIGS. 3 and 6, a plurality of source lines SL1 extending in a first direction (for example, a column direction), and a plurality of gate lines GL1 extending in a second direction (for example, a row direction) different from the first direction are formed, and thin film transistor TFT1 is formed close to an intersection between each of the plurality of source lines SL1 and each of the plurality of gate lines GL1. In plan view of display panel LCP1, a region surrounded by two source lines SL1 adjacent to each other and two gate lines GL1 adjacent to each other is defined as one pixel PIX1, and a plurality of pixels PIX1 are disposed in a matrix form (the row direction and the column direction). The plurality of source lines SL1 are disposed at equal intervals in the row direction, and the plurality of gate lines GL1 are disposed at equal intervals in the column direction. In thin film transistor substrate TFTB1, pixel electrode PIT1 is formed in each pixel PIX1, and one common electrode CIT1 (see FIG. 9) common to the plurality of pixels PIX1 is formed. Drain electrode DE1 constituting thin film transistor TFT1 is electrically connected to source line SL1, source electrode SE1 is electrically connected to pixel electrode PIT1 through contact hole CH1, and gate electrode GE1 is electrically connected to gate line GL1.

As illustrated in FIG. 5, a light transmission unit that transmits light and black matrix BM (a light shielding unit) that obstructs the light transmission are formed in counter substrate CF1. A plurality of color filters FIL (colored layer) are formed in the light transmission unit according to each pixel PIX1. The light transmission unit is surrounded by black matrix BM. For example, the light transmission unit is formed into a rectangular shape. The plurality of color filters FIL include red color filters FILR (red layer) made of a red (R color) material to transmit red light, green color filters FILG (green layer) made of a green (G color) material to transmit green light, and blue color filters FILB (blue layer) made of a blue (B color) material to transmit blue light. Red color filters FILR, green color filters FILG, and blue color filters FILB are repeatedly arrayed in the row direction in this order, identical-color filters FIL are arrayed in the column direction, and black matrix BM1 is formed at a boundary between color filters FIL adjacent to each other in the row direction and the column direction. According to each color filter FIL, as illustrated in FIG. 3, the plurality of pixels PIX1 include red pixels PIXR corresponding to red color filter FILR, green pixels PIXG corresponding to green color filter FILG, and blue pixels PIXB corresponding to blue color filter FILB. In display panel LCP1, red pixels PIXR, green pixels PIXG, and blue pixels PIXB are repeatedly arrayed in the row direction in this order, and pixels PIX1 having the identical color are arrayed in the column direction.

Black matrix BM and color filter FIL (red color filter FILR, green color filter FILG, and blue color filter FILB) may be formed on thin film transistor substrate TFTB1. That is, display panel LCP1 may include a configuration of color filter on array (COA).

A plurality of spacers PS1, which are disposed between thin film transistor substrate TFTB1 and counter substrate CF1 while holding a distance (gap) between both the substrates, are formed in counter substrate CF1. In FIG. 6, for convenience, an external form of spacer PS1 is indicated by a dotted line. As illustrated in FIG. 6, spacer PS1 is disposed so as to overlap a part of thin film transistor TFT1 in planar view. One or a plurality of spacers PS1 may be provided with respect to one pixel group including pixel PIX1 (for example, red pixel PIXR, green pixel PIXG, and blue pixel PIXB) of each color, or one spacer PS1 may be provided with respect to a plurality of pixel groups. A shape of spacer PS1 is not limited to a columnar shape, but may be a prismatic shape or a conical shape. Spacer PS1 may include two kinds of spacers in which heights are different from each other. Specifically, spacer PS1 may include main spacer PS1(M) (see FIG. 9) that is in contact with thin film transistor substrate TFTB1 in a normal state and sub-spacer PS1(S) (see FIG. 9). Sub-spacer PS1(S) is not in contact with thin film transistor substrate TFTB1 in the normal state, and sub-spacer PS1(S) comes into contact with thin film transistor substrate TFTB1 when display panel LCP1 is deformed. Improvement of pressure tightness and prevention of bubble generation during low temperatures can be achieved by providing sub-spacer PS1(S).

First timing controller TCON1 has a known configuration. For example, based on first image data DAT1 and first control signal CS1 (such as a clock signal, a vertical synchronizing signal, and a horizontal synchronizing signal), which are output from image processor IPU, first timing controller TCON1 generates various timing signals (data start pulse DSP1, data clock DCK1, gate start pulse GSP1, and gate clock GCK1) to control first image data DA1 and drive of first source driver SD1 and first gate driver GD1 (see FIG. 3). First timing controller TCON1 outputs first image data DA1, data start pulse DSP1, and data clock DCK1 to first source driver SD1, and outputs gate start pulse GSP1 and gate clock GCK1 to first gate driver GD1.

First source driver SD1 outputs a data signal (data voltage) corresponding to first image data DA1 to source line SL1 based on data start pulse DSP1 and data clock DCK1. First gate driver GD1 outputs a gate signal (gate voltage) to gate lines GL1 based on gate start pulse GSP1 and gate clock GCK1.

First source driver SD1 supplies the data voltage to each source line SL1, and first gate driver GD1 supplies the gate voltage to each gate line GL1. Common voltage Vcom is supplied from a common driver (not illustrated) to common electrode CIT1. When the gate voltage (gate-on voltage) is supplied to gate line GL1, thin film transistor TFT1 connected to gate line GL1 is turned on, and the data voltage is supplied to pixel electrode PIT1 through source line SL1 connected to thin film transistor TFT1. An electric field is generated by a difference between the data voltage supplied to pixel electrode PIT1 and common voltage Vcom supplied to common electrode CIT1. The liquid crystal is driven by the electric field, and transmittance of the light emitted from backlight BL is controlled, thereby displaying an image. In display panel LCP1, a color image is displayed by the supply of a desired data voltage to source line SL1 connected to pixel electrode PIT1 of each of red pixel PIXR, green pixel PIXG, and blue pixel PIXB.

The configuration of display panel LCP2 will be described below with reference to FIGS. 4, 5, and 7. As illustrated in FIG. 5, display panel LCP2 includes thin film transistor substrate TFTB2 disposed on the side of backlight BL, thin film transistor substrate TFTB1 that is a counter substrate and that is disposed on the observer side while being opposite to thin film transistor substrate TFTB2, and liquid crystal layer LC2 disposed between thin film transistor substrate TFTB1 and thin film transistor substrate TFTB2. Diffusion layer DL and polarizing layer POL2 are formed on the side of liquid crystal layer LC2 of thin film transistor substrate TFTB1. As to laminating order of diffusion layer DL and polarizing layer POL2, in FIG. 5, polarizing layer POL2 is formed closer to liquid crystal layer LC2, and diffusion layer DL is formed closer to liquid crystal layer LC1. Alternatively, diffusion layer DL may be formed closer to liquid crystal layer LC2, and polarizing layer POL2 may be formed closer to liquid crystal layer LC1. Polarizing plate POL3 is disposed on the side of backlight BL of display panel LCP2. Thin film transistor substrate TFTB1 acts as the counter substrate of thin film transistor substrate and display panel LCP2 of display panel LCP1.

In thin film transistor substrate TFTB2, as illustrated in FIGS. 4 and 7, a plurality of source lines SL2 extending in the column direction, and a plurality of gate lines GL2 extending in the row direction are formed, and thin film transistor TFT2 is formed close to the intersection between each of the plurality of source lines SL2 and each of the plurality of gate lines GL2. In plan view of display panel LCP2, a region surrounded by two source lines SL2 adjacent to each other and two gate lines GL2 adjacent to each other is defined as one pixel PIX2, and a plurality of pixels PIX2 are disposed in a matrix form (the row direction and the column direction). The plurality of source lines SL2 are disposed at equal intervals in the row direction, and the plurality of gate lines GL2 are disposed at equal intervals in the column direction. In thin film transistor substrate TFTB2, pixel electrode PIT2 is formed in each pixel PIX2, and one common electrode CIT2 (see FIG. 9) common to the plurality of pixels PIX2 is formed. Drain electrode DE2 constituting thin film transistor TFT2 is electrically connected to source line SL2, source electrode SE2 is electrically connected to pixel electrode PIT2 through contact hole CH2, and gate electrode GE2 is electrically connected to gate line GL2.

A plurality of spacers PS2, which are disposed between thin film transistor substrate TFTB2 and thin film transistor substrate TFTB1 while holding a distance (gap) between both the substrates, are formed in thin film transistor substrate TFTB2. In FIG. 7, for convenience, an external form of spacer PS2 is indicated by a dotted line. As illustrated in FIG. 7, spacer PS2 is disposed so as to overlap a part of thin film transistor TFT2 in planar view. One or a plurality of spacers PS2 may be provided with respect to one pixel group including a plurality of pixel PIX2 (for example, three pixels PIX2 corresponding to red pixel PIXR, green pixel PIXG, and blue pixel PIXB of display panel LCP1), or one spacer PS2 may be provided with respect to a plurality of pixel groups. A shape of spacer PS2 is not limited to a columnar shape, but may be a prismatic shape or a conical shape. Spacer PS2 may include two kinds of spacers in which heights are different from each other. Specifically, spacer PS2 may include main spacer PS2(M) (see FIG. 9) that is in contact with thin film transistor substrate TFTB1 in a normal state and sub-spacer PS2(S) (see FIG. 9). Sub-spacer PS2(S) is not in contact with thin film transistor substrate TFTB1 in the normal state, and sub-spacer PS2(S) comes into contact with thin film transistor substrate TFTB1 when display panel LCP2 is deformed. The improvement of the pressure tightness and the prevention of the bubble generation during low temperatures can be achieved by providing sub-spacer PS2(S). Spacer PS1 of display panel LCP1 and spacer PS2 of display panel LCP2 are disposed such that a center position of spacer PS1 is matched with a center of spacer PS2 in planar view. The number of spacer PS1 may be equal to or different from the number of spacer PS2.

Second timing controller TCON2 has a known configuration. For example, based on second image data DAT2 and second control signal CS2 (such as a clock signal, a vertical synchronizing signal, and a horizontal synchronizing signal), which are output from image processor IPU, second timing controller TCON2 generates various timing signals (data start pulse DSP2, data clock DCK2, gate start pulse GSP2, and gate clock GCK2) to control second image data DA2 and drive of second source driver SD2 and second gate driver GD2 (see FIG. 4). Second timing controller TCON2 outputs second image data DA2, data start pulse DSP2, and data clock DCK2 to second source driver SD2, and outputs gate start pulse GSP2 and gate clock GCK2 to second gate driver GD2.

Second source driver SD2 outputs the data voltage corresponding to second image data DA2 to source line SL2 based on data start pulse DSP2 and data clock DCK2. Second gate driver GD2 outputs the gate voltage to gate lines GL2 based on gate start pulse GSP2 and gate clock GCK2.

Second source driver SD2 supplies the data voltage to each source line SL2, and second gate driver GD2 supplies the gate voltage to each gate line GL2. The common driver supplies common voltage Vcom to common electrode CIT2. When the gate voltage (gate-on voltage) is supplied to gate line GL2, thin film transistor TFT2 connected to gate line GL2 is turned on, and the data voltage is supplied to pixel electrode PIT2 through source line SL2 connected to thin film transistor TFT2. An electric field is generated by a difference between the data voltage supplied to pixel electrode PIT2 and common voltage Vcom supplied to common electrode CIT2. The liquid crystal is driven by the electric field, and transmittance of the light emitted from backlight BL is controlled, thereby displaying an image. A black-and-white image is displayed on display panel LCP2.

Figure 8A:
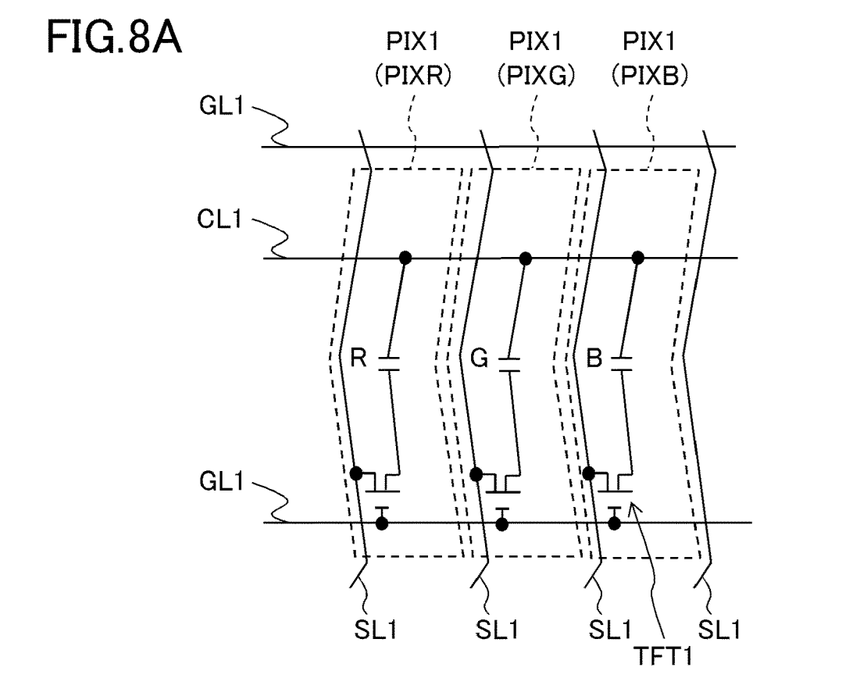
FIGS. 8A and 8B are plan views each illustrating a disposition relationship between pixel of display panel LCP1 and pixel of display panel LCP2.
Figure 8B:
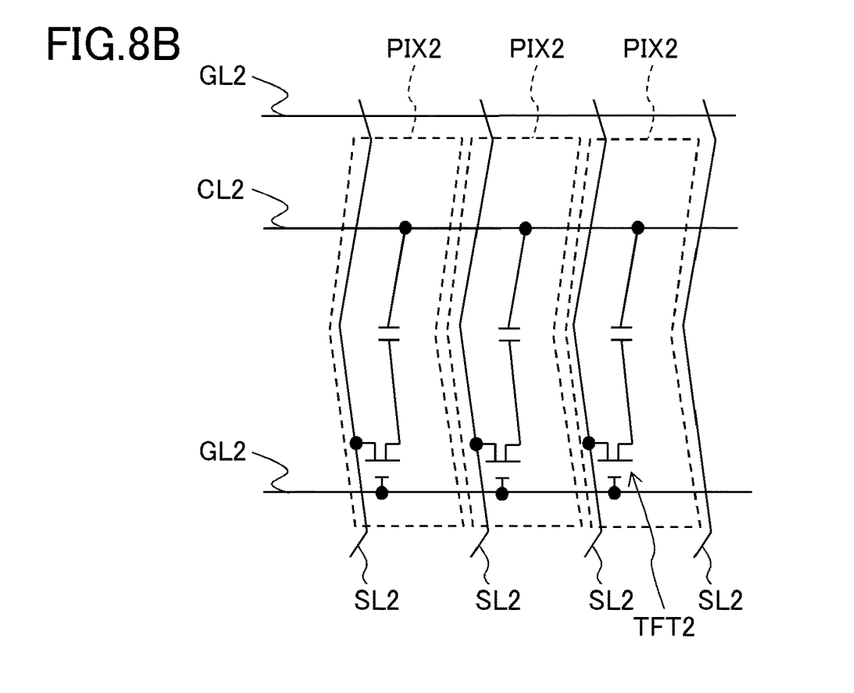

FIGS. 8A and 8B are plan views each illustrating a disposition relationship between pixel PIX1 of display panel LCP1 and pixel PIX2 of display panel LCP2. Liquid crystal display device LCD is configured such that a number of pixels PIX1 (a number of pixel electrodes PIX1) per unit area of display panel LCP1 is equal to a number of pixels PIX2 (a number of pixel electrodes PIX2) per unit area of display panel LCP2. An area of one pixel PIX1 is equal to an area of one pixel PIX2. That is, display panel LCP1 and display panel LCP2 have identical resolution.

Figure 9:
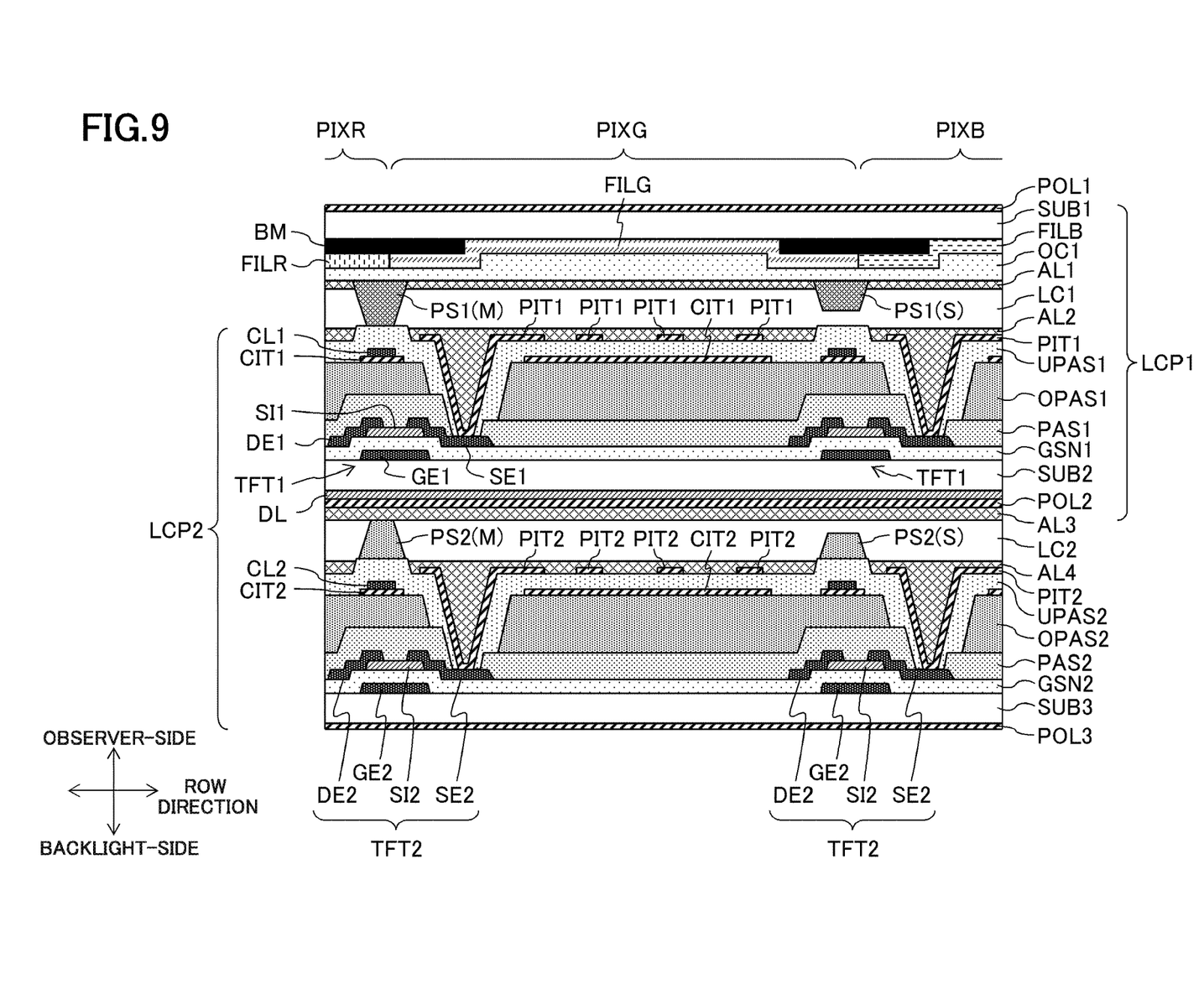
FIG. 9 is a sectional view taken along line B-B in FIGS. 6 and 7.

FIG. 9 is a sectional view taken along line B-B in FIGS. 6 and 7. The sectional structures of pixels PIX1, PIX2 will be described below with reference to FIG. 9.

In thin film transistor substrate TFTB1 (see FIG. 5) constituting pixel PIX1 of display panel LCP1, gate line GL1 (see FIG. 6) and gate electrode GE1 are formed on a first surface (on the observer side) of transparent substrate SUB2 (glass substrate) (first substrate), and gate insulator GSN1 is formed so as to cover gate line GL1 and gate electrode GE1. Source line SL1 (see FIG. 6), drain electrode DE1, source electrode SE1, and semiconductor layer SI1 are formed on gate insulator GSN1, protective insulator PAS1 and organic insulator OPAS1 are sequentially formed so as to cover source lines SL1, drain electrode DE1, source electrode SE1, and semiconductor layer SI1, common electrode CIT1 is formed on organic insulator OPAS1, and upper insulator UPAS1 is formed so as to cover common electrode CIT1. Common wiring CL1, which overlaps source line SL1 in planar view, is formed on common electrode CIT1. Pixel electrode PIT1 is formed on upper insulator UPAS1, and alignment film AL2 is formed so as to cover pixel electrode PIT1. Contact hole CH1 (see FIG. 6) is made in protective insulator PAS1, organic insulator OPAS1, and upper insulator UPAS1, and a part of pixel electrode PIT1 is electrically connected to source electrode SE1 through contact hole CH1. For example, organic insulator OPAS1 is made of an acrylic positive photosensitive resin. A known material can be used as the acrylic positive photosensitive resin.

In counter substrate CF1 (see FIG. 5), black matrix BM and color filter FIL (red color filter FILR, green color filter FILG, and blue color filter FILB) are formed on transparent substrate SUB1 (glass substrate) (second substrate). Overcoat film OC1 covers a surface of color filter layer FIL, and alignment film AL1 is formed on overcoat film OC1. In a region overlapping black matrix BM in planar view, main spacer PS1(M) and sub-spacer PS1(S) are formed on overcoat film OC1. An end of main spacer PS1(M) on the side of display panel LCP2 is in contact with a projection in which thin film transistor TFT1 and common wiring CL1 are laminated on thin film transistor substrate TFTB1. A predetermined gap is formed between an end of sub-spacer PS1(S) on the side of display panel LCP2 and thin film transistor substrate TFTB1. Spacer PS1 is made of, for example, an acrylic negative photosensitive resin. A known material can be used as the acrylic negative photosensitive resin.

Black matrix BM and color filter FIL (red color filter FILR, green color filter FILG, and blue color filter FILB) may be formed on thin film transistor substrate TFTB1. That is, display panel LCP1 may include a configuration of color filter on array (COA).

In thin film transistor substrate TFTB2 (see FIG. 5) constituting pixel PIX2 of display panel LCP2, gate line GL2 (see FIG. 7) and gate electrode GE2 are formed on transparent substrate SUB3 (glass substrate) (third substrate), and gate insulator GSN2 is formed so as to cover gate line GL2 and gate electrode GE2. Source line SL2 (see FIG. 7), drain electrode DE2, source electrode SE2, and semiconductor layer SI2 are formed on gate insulator GSN2, protective insulator PAS2 and organic insulator OPAS2 are sequentially formed so as to cover source lines SL2, drain electrode DE2, source electrode SE2, and semiconductor layer SI2, common electrode CIT2 is formed on organic insulator OPAS2, and upper insulator UPAS2 is formed so as to cover common electrode CIT2. Common wiring CL2 overlapping source line SL2 in planar view is formed on common electrode CIT2. Common wiring CL2 also acts as the black matrix. Pixel electrode PIT2 is formed on upper insulator UPAS2, and alignment film AL4 is formed so as to cover pixel electrode PIT2. Contact hole CH2 (see FIG. 7) is made in protective insulator PAS2, organic insulator OPAS2, and upper insulator UPAS2, and a part of pixel electrode PIT2 is electrically connected to source electrode SE2 through contact hole CH2. Main spacer PS2(M) and sub-spacer PS2(S) are formed on upper insulator UPAS2 so as to overlap thin film transistor TFT1 and common wiring CL1 in planar view. An end of main spacer PS2(M) on the side of display panel LCP1 is in contact with thin film transistor substrate TFTB1. A predetermined gap is formed between an end of sub-spacer PS1(S) on the side of display panel LCP1 and thin film transistor substrate TFTB1. Organic insulator OPAS2 and spacer PS2 are made of an identical material, for example, an acrylic positive photosensitive resin. A known material can be used as the acrylic positive photosensitive resin.

In thin film transistor substrate TFTB1 (see FIG. 5) as the counter substrate, diffusion layer DL and polarizing layer POL2 are sequentially formed on a second surface (on the side of backlight BL) of transparent substrate SUB2 (glass substrate) (first substrate), and alignment film AL3 is formed on polarizing layer POL2. Diffusion layer DL may be formed while a light diffusion member is applied onto diffusion layer DL, or while a light diffusion film is laminated on diffusion layer DL. Polarizing layer POL2 may be formed while a polarizing member is applied onto polarizing layer POL2, or while a polarizing film is laminated on polarizing layer POL2.

In the above configuration, thin film transistor substrate TFTB1 of display panel LCP1 acts as the counter substrate of display panel LCP2, so that the counter substrate that is independently disposed for display panel LCP2 can be eliminated. That is, liquid crystal display device LCD including two display panels LCP1, LCP2 can be constructed with three substrates. Consequently, weight reduction and low profile of the liquid crystal display device can be achieved compared with the conventional liquid crystal display device constructed with four substrates. In the above configuration, the number of glass substrates disposed between liquid crystal layers LC1, LC2 is decreased to one compared with the conventional liquid crystal display device, so that appearance of periodic light and shade (what is called moire) of luminance can be prevented while parallax is decreased.

Figure 10:
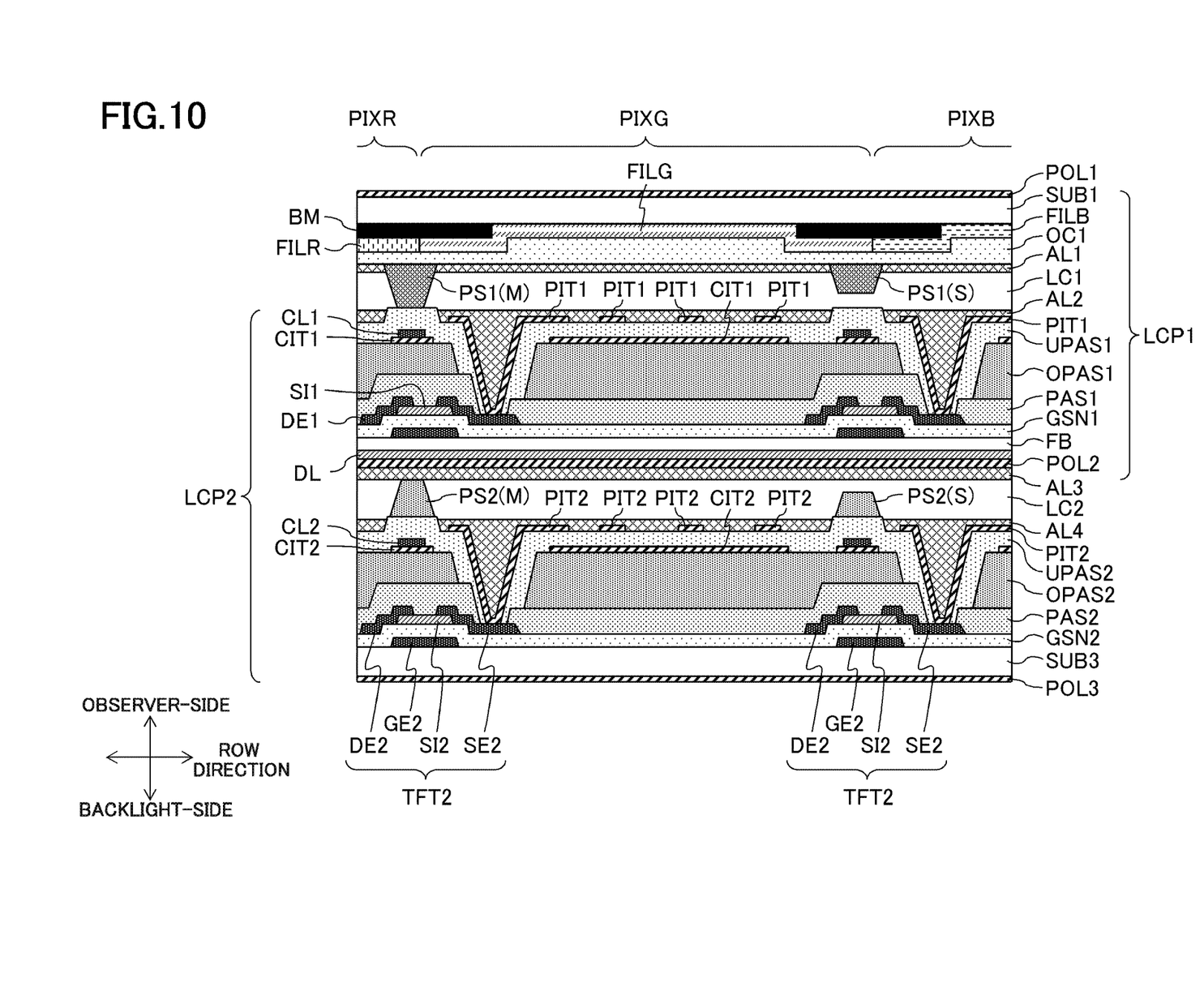
FIG. 10 is a sectional view illustrating another configuration of liquid crystal display device.

The liquid crystal display device of the present disclosure is not limited to the above configuration. FIG. 10 is a sectional view illustrating another configuration of liquid crystal display device LCD. In liquid crystal display device LCD of FIG. 10, glass substrate SUB2 is eliminated in thin film transistor substrate TFTB1, and film substrate FB (first substrate) is added to thin film transistor substrate TFTB1. For example, film substrate FB is made of a material, such as polyimide and polyester, which has flexibility. In liquid crystal display device LCD, thin film transistor TFT2, each signal line, and each insulator are formed on a first surface (on the observer side) of film substrate FB. Polarizing layer POL2 and alignment film AL3 are sequentially formed on a second surface (on the side of backlight BL) of film substrate FB. A known method can be adopted to the method for manufacturing thin film transistor substrate TFTB1. For example, film substrate FB is formed on an underlying layer (for example, glass) with a release layer interposed therebetween, thin film transistor TFT2, each signal line, and each insulator are formed on the film substrate, and the underlying layer is released, which allows the manufacturing of thin film transistor substrate TFTB1. Another configuration of liquid crystal display device LCD in FIG. 10 is identical to the configuration of liquid crystal display device LCD in FIG. 9.

In another configuration of FIG. 10, thin film transistor substrate TFTB1 of display panel LCP1 is constructed with the film substrate, so that the weight reduction and low profile of the liquid crystal display device can further be achieved compared with the configuration in FIG. 9. Compared with the configuration in FIG. 9, the appearance of the moire can further be prevented while parallax is further decreased.

For example, the film substrate in FIG. 10 can be used in counter substrate CF1 of display panel LCP1 or thin film transistor substrate TFTB2 of display panel LCP2. For example, counter substrate CF1 of display panel LCP1 and thin film transistor substrate TFTB2 of display panel LCP2 may be constructed with the film substrate while thin film transistor substrate TFTB1 of display panel LCP1 may be constructed with the glass substrate. For example, the glass substrate of liquid crystal display device LCD may wholly be constructed with the film substrate. In the configuration, liquid crystal display device LCD having the flexibility can be made. Thus, in liquid crystal display device LCD, at least one of thin film transistor substrate TFTB1, counter substrate CF1, and thin film transistor substrate TFTB2 may be constructed with the film substrate.

Figure 11:
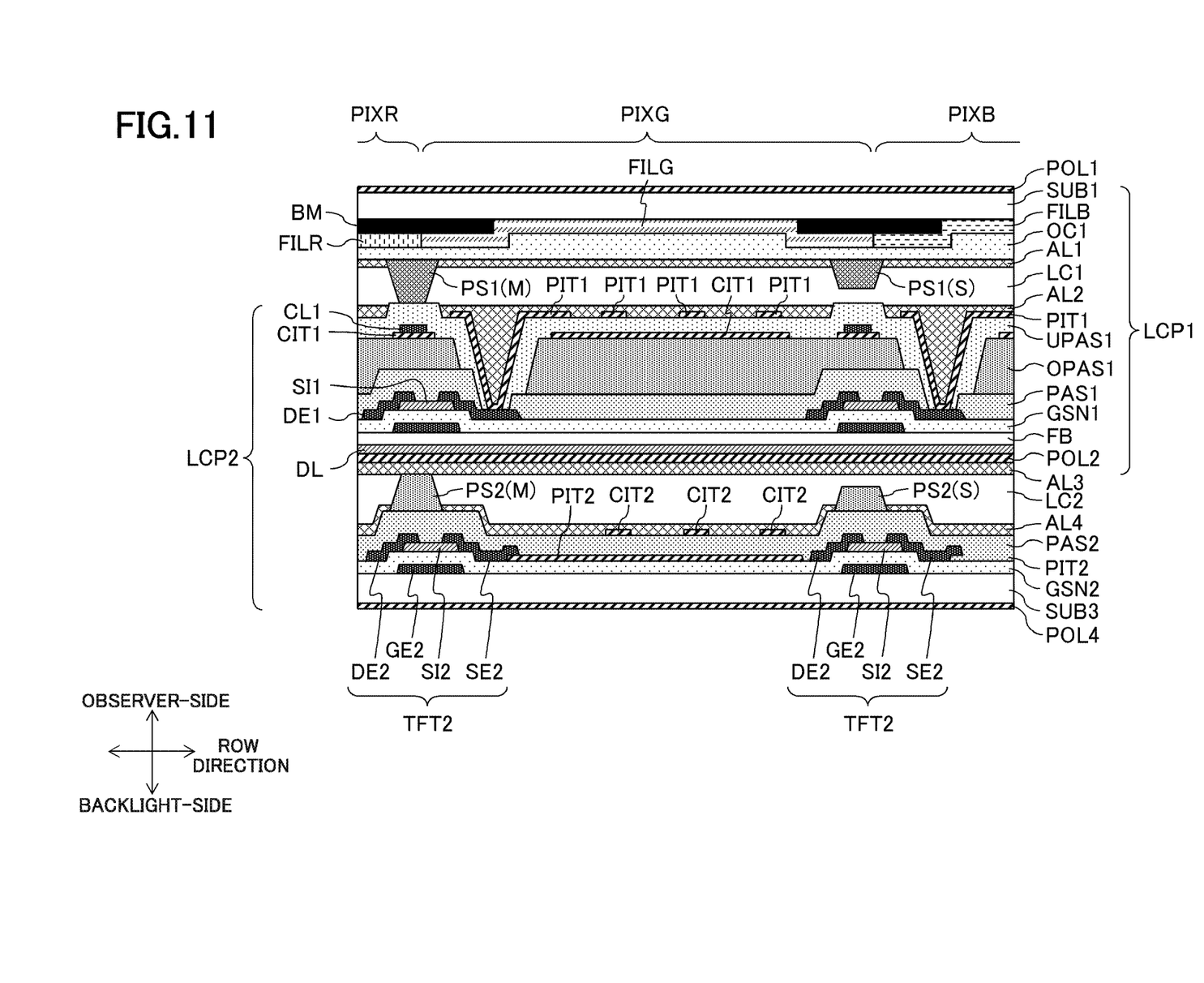
FIG. 11 is a sectional view illustrating another configuration of liquid crystal display device.
Figure 12:
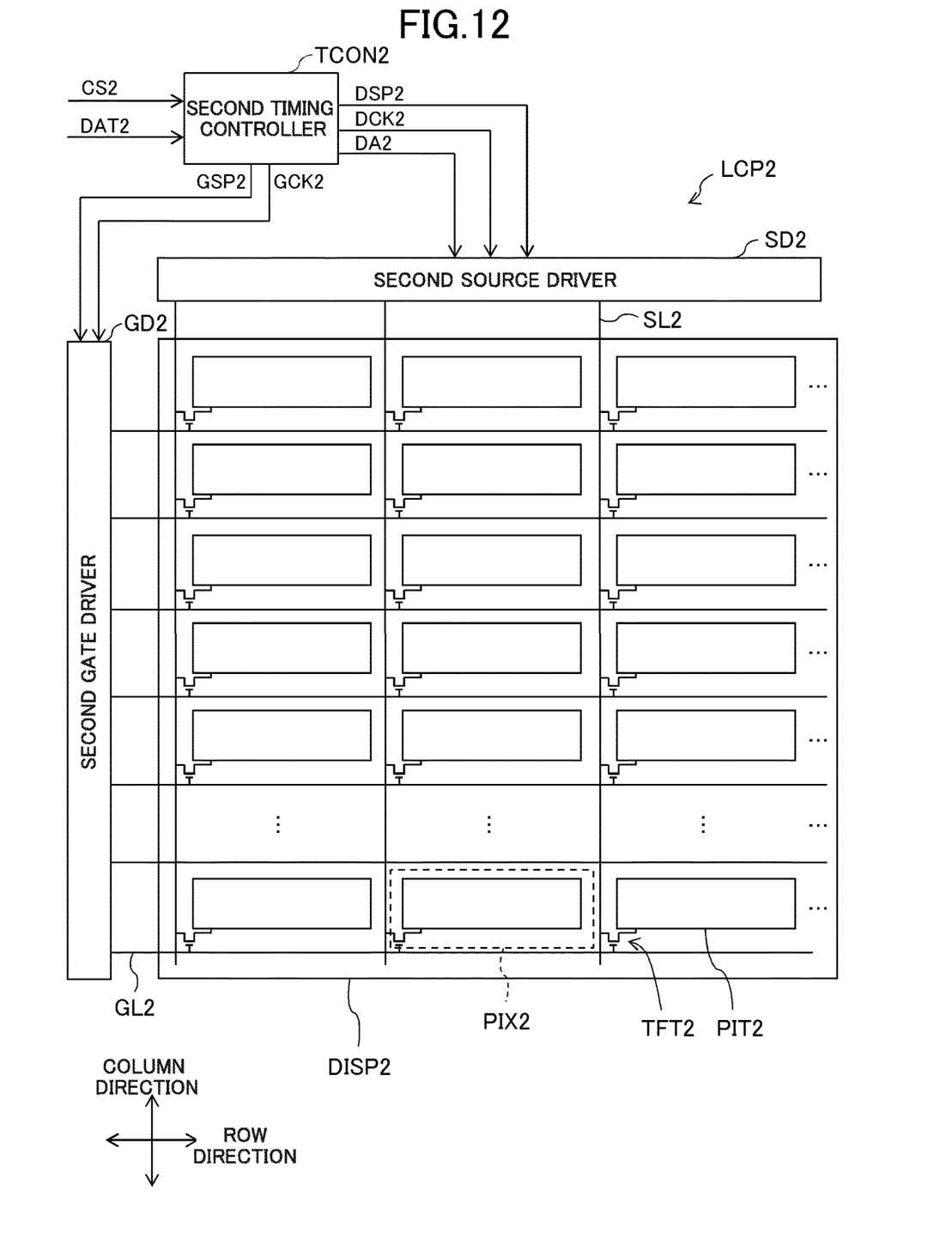
FIG. 12 is a plan view illustrating a schematic configuration of pixel of display panel LCP2.

Liquid crystal display device LCD is not limited to the above pixel configuration. For example, a sectional structure of pixel PIX2 of display panel LCP2 may be simplified. FIG. 11 is a sectional view illustrating yet another configuration of liquid crystal display device LCD. Specifically, as illustrated in FIG. 11, in thin film transistor substrate TFTB2 of display panel LCP2, pixel electrode PIT2 may be formed on gate insulator GSN2, protective insulator PAS2 may be formed so as to cover pixel electrode PIT2, and common electrode CIT2 may be formed on protective insulator PAS2. Consequently, thinner display panel LCP2 and the simplification of the process of manufacturing display panel LCP2 can be achieved.

Figure 13A:
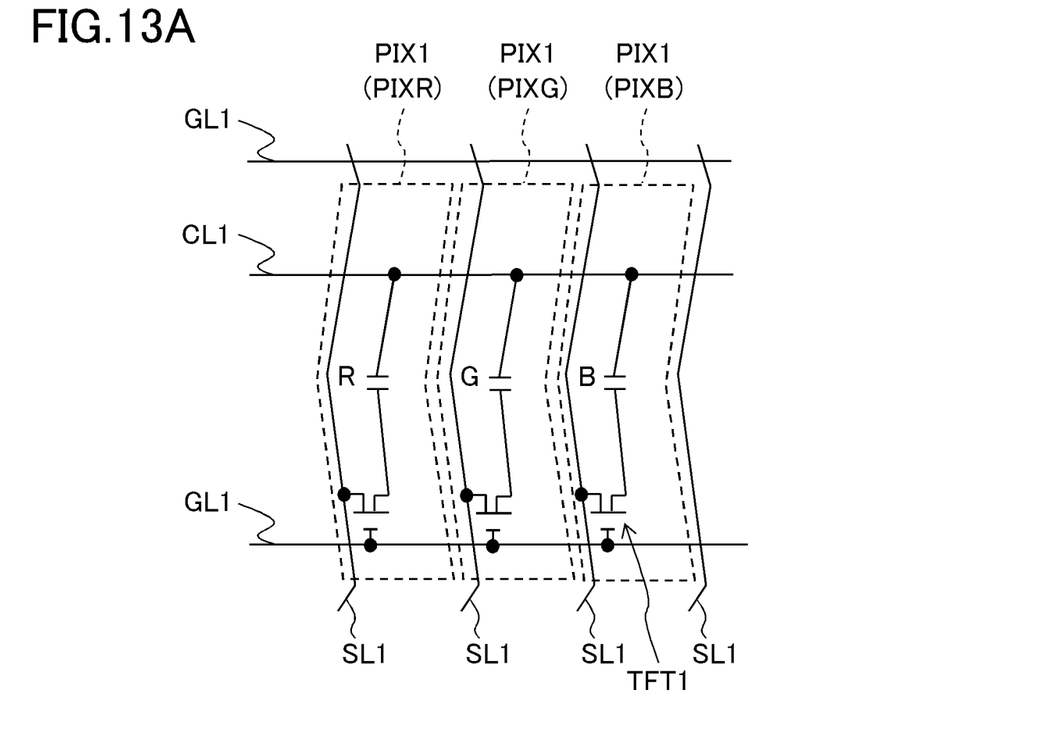
FIGS. 13A and 13B are plan views each illustrating another disposition relationship between pixel of display panel LCP1 and pixel of display panel LCP2.
Figure 13B:
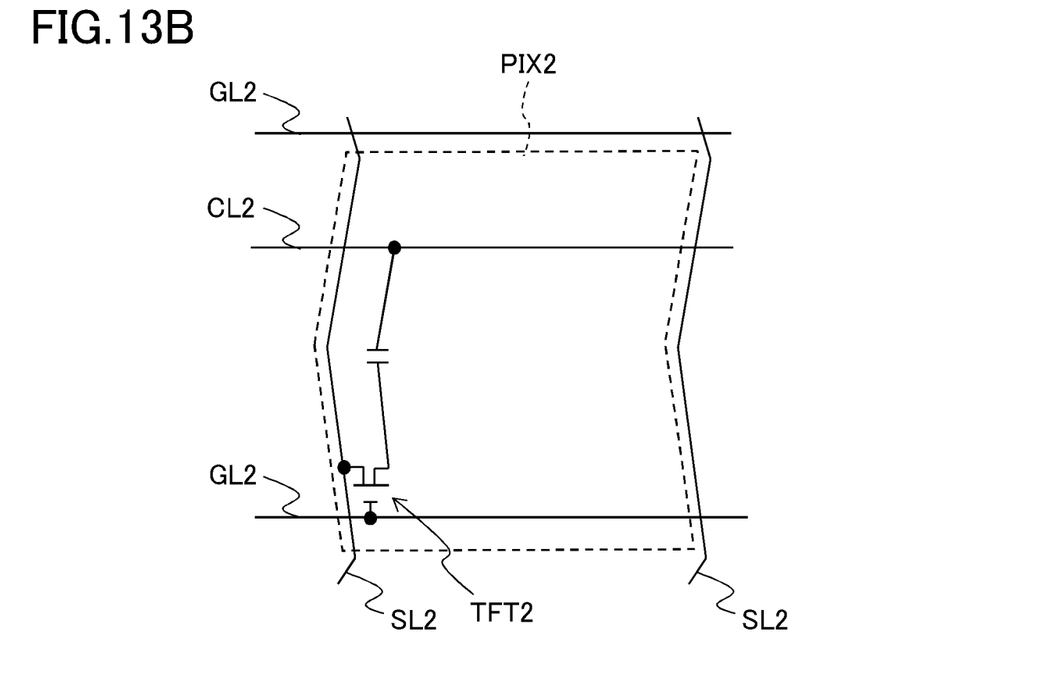

The disposition relationship between pixel PIX1 of display panel LCP1 and pixel PIX2 of display panel LCP2 is not limited to those in FIGS. 3, 4, 8A, and 8B. For example, as illustrated in FIGS. 3, 12, 13A, and 13B, liquid crystal display device LCD may be configured such that a number of pixels PIX2 (a number of pixel electrodes PIT2) per unit area of display panel LCP2 is smaller than a number of pixels PIX1 (a number of pixel electrodes PIT1) per unit area of display panel LCP1. Specifically, as illustrated in FIGS. 13A and 13B, liquid crystal display device LCD is configured such that the ratio of the number of pixels PIX1 of display panel LCP1 to the number of pixels PIX2 of display panel LCP2 is 3:1. Three pixels PIX1 (red pixel PIXR, green pixel PIXG, blue pixel PIXB) of display panel LCP1 and one pixel PIX2 of display panel LCP2 are disposed so as to overlap each other in planar view.

In liquid crystal display device LCD, display panel LCP1 may be disposed on the backlight side, and display panel LCP2 may be disposed on the observer side. In this case, thin film transistor substrate TFTB2 of display panel LCP2 has the configuration similar to that of thin film transistor substrate TFTB1, and may be configured to be also used as the counter substrate of display panel LCP1.

Although exemplary embodiments of the present disclosure are described above, the present disclosure is not limited to these exemplary embodiments. It is noted that exemplary embodiments properly changed from the exemplary embodiments described above by those skilled in the art without departing from the scope of the present disclosure are included in the present disclosure.

What is claimed is:

1. A liquid crystal display device in which a plurality of display panels are disposed so as to overlap each other, each of the display panels displaying an image, the liquid crystal display device comprising:
   a first substrate;
   a second substrate disposed opposite to the first substrate in a first direction;
   a first liquid crystal layer disposed between the first substrate and the second substrate;
   a third substrate disposed opposite to the first substrate in a second direction that is an opposite direction to the first direction; and
   a second liquid crystal layer disposed between the first substrate and the third substrate, wherein the first substrate includes a first surface on a side of the first direction and a second surface opposite to the first surface on a side of the second direction, the first liquid crystal layer and the second liquid crystal layer accommodate no more than one substrate therebetween, a first gate line, a first source line, a first insulator, an electrode constituting a first thin film transistor, and a first pixel electrode are formed on the first surface of the first substrate, a polarizing layer is formed on the second surface of the first substrate a first alignment film is provided on the first surface of the first substrate, a second alignment film is provided on the second surface of the first substrate, and the polarizing layer is disposed between the second alignment film and the first substrate.

2. The liquid crystal display device according to claim 1, wherein a diffusion layer is formed on the second surface of the first substrate, and the diffusion layer is disposed between the first substrate and the polarizing layer.

3. The liquid crystal display device according to claim 2, wherein the second alignment film is in contact with the polarizing layer.

4. The liquid crystal display device according to claim 2, wherein
a black matrix and a color filter are formed on the second substrate, and
a second gate line, a second source line, a second insulator, an electrode constituting a second thin film transistor, and a second pixel electrode are formed on the third substrate.

5. The liquid crystal display device according to claim 4, further comprising:
a first spacer provided on the second substrate; and
a second spacer provided on the third substrate.

6. The liquid crystal display device according to claim 1, wherein the first substrate is a film substrate.

7. The liquid crystal display device according to claim 6, wherein a color filter is further formed on the first surface of the first substrate.

8. The liquid crystal display device according to claim 1, wherein the first substrate includes a glass substrate or a film substrate.

9. The liquid crystal display device according to claim 1, wherein the first substrate is a film substrate, and the second substrate and the third substrate are a glass substrate.

10. The liquid crystal display device according to claim 4, wherein a number of second pixel electrodes per unit area is smaller than a number of first pixel electrodes per unit area.

11. The liquid crystal display device according to claim 1, wherein an alignment film is formed on the second surface of the first substrate, and the alignment film is in contact with the polarizing layer.

12. The liquid crystal display device according to claim 1, wherein, of the first, second, and third substrates, only the first substrate is disposed between the first liquid crystal layer and the second liquid crystal layer.

13. The liquid crystal display device according to claim 1, further comprising:
a first spacer provided on the second substrate; and
a second spacer provided on the third substrate.

14. A liquid crystal display device in which a plurality of display panels are disposed so as to overlap each other, each of the display panels displaying an image, the liquid crystal display device comprising:
a first substrate;
a second substrate disposed opposite to the first substrate in a first direction;
a first liquid crystal layer disposed between the first substrate and the second substrate;
a first spacer provided on the second substrate;
a third substrate disposed opposite to the first substrate in a second direction that is an opposite direction to the first direction;
a second liquid crystal layer disposed between the first substrate and the third substrate; and
a second spacer provided on the third substrate, wherein
the first substrate includes a first surface on a side of the first direction and a second surface opposite to the first surface on a side of the second direction,
the first liquid crystal layer and the second liquid crystal layer accommodate no more than one substrate therebetween,
a first gate line, a first source line, a first insulator, an electrode constituting a first thin film transistor, and a first pixel electrode are formed on the first surface of the first substrate,
a second gate line, a second source line, a second insulator, an electrode constituting a second thin film transistor, and a second pixel electrode are formed on the third substrate.

* * * * *